No. 657,009. Patented Aug. 28, 1900.
T. H. ROLFE.
FEEDER ATTACHMENT FOR THRESHING MACHINES.
(Application filed Mar. 1, 1900.)
(No Model.)
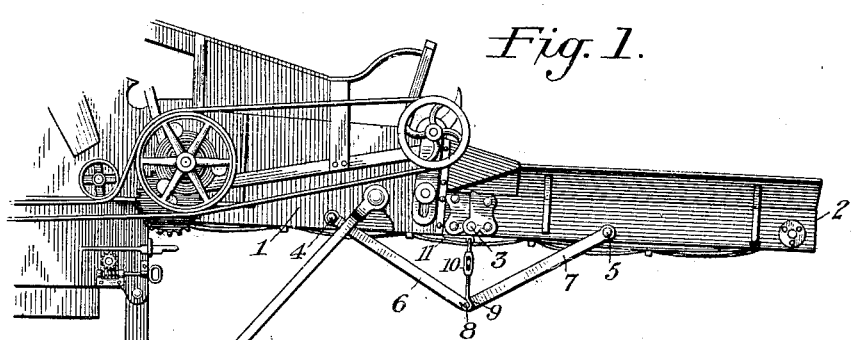
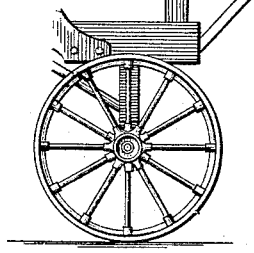
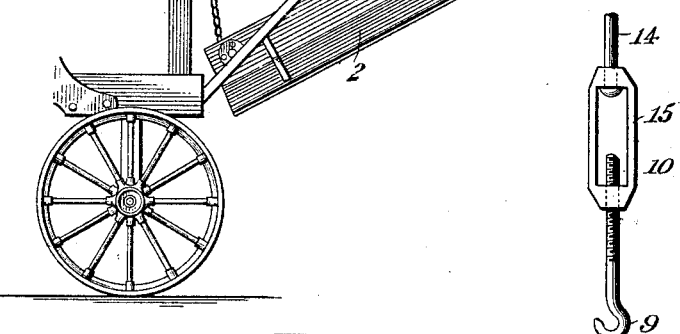
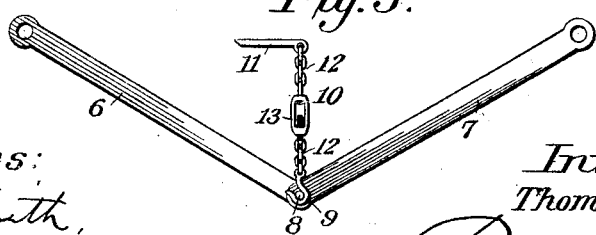
Witnesses:
A. M. Smith,
E. E. Lodge
Inventor:
Thomas H. Rolfe,
By Rexford M. Smith
Attorney.
THE NORRIS PETERS CO., PHOTO-LITHO., WASHINGTON, D. C.

UNITED STATES PATENT OFFICE.

THOMAS H. ROLFE, OF BATTLE CREEK, MICHIGAN, ASSIGNOR TO THE NICHOLS & SHEPARD COMPANY, OF SAME PLACE.

FEEDER ATTACHMENT FOR THRESHING-MACHINES.

SPECIFICATION forming part of Letters Patent No. 657,009, dated August 28, 1900.

Application filed March 1, 1900. Serial No. 6,990. (No model.)

*To all whom it may concern:*

Be it known that I, THOMAS H. ROLFE, a citizen of the United States, residing at Battle Creek, in the county of Calhoun and State of Michigan, have invented a certain new and useful Feeder Attachment for Threshers, of which the following is a specification, reference being had therein to the accompanying drawings.

This invention relates to feeder attachments for threshing-machines; and the object in view is to dispense with the legs which are attached to the outer projecting end of the feeder for the purpose of supporting the same from the ground. The invention aims to provide in lieu of said supporting-legs means carried by the feeder, whereby the hinged extension or folding member of the feeder may be firmly sustained in operative position and in true alinement with the fixed portion of the feeder. In connection with the feeder-supporting devices hereinafter described I also employ an adjustment or tension device, which facilitates the lining up of the folding portion of the feeder.

Other objects and advantages of the invention will appear in the course of the ensuing description.

The invention consists in certain novel features and details of construction and arrangement of parts, as hereinafter fully described, illustrated in the drawings, and incorporated in the claim.

In the accompanying drawings, Figure 1 is a side elevation of a portion of a threshing-machine, showing the folding feeder extension and the improved supporting means therefor. Fig. 2 is a similar view showing the feeder extension folded for transportation or storage. Fig. 3 is an enlarged detail view of the supporting devices and adjustable connection. Fig. 4 is a detail view showing a modified form of adjustable connection.

Similar numerals of reference are employed to designate corresponding parts in all the figures of the drawings.

Referring to the drawings, 1 designates the stationary member of the feeder of a threshing-machine, and 2 the hinged and folding extension thereof. When the machine is set up for operation, the extension 2 is arranged in longitudinal alinement with the stationary portion 1.

The extension 2 is connected to the stationary member 1 by means of a hinge-joint 3, and connected pivotally to the members 1 and 2 at the points 4 and 5 are thrust members in the form of toggle-links 6 and 7, said toggle-links being of equal length and the pivotal points 4 and 5 being equidistant from the pintle of the hinge 3, which forms the center of motion about which the hinged extension 2 swings. It is to be understood that hinges 3 are employed at each side of the feeder and also two sets of toggle-links—one set on each side of the feeder. The contiguous ends of the links 6 and 7 are pivotally connected by pins 8, with which a hook 9 is adapted to be associated. The hook 9 is formed on the lower end of a tension member in the form of an adjustable connection 10, which is interposed between said pin 8 and a hanger 11, arranged adjacent to the pivotal point of the folding extension 2.

The connection 10 may consist either of a chain 12, having a turnbuckle 13 intermediate its ends, as shown in Fig. 3, or it may consist of a rod 14, provided at a suitable point with a turnbuckle 15, as shown in Fig. 4. In each instance, however, the connection 10 as a whole is attached at its upper end to the feeder at a point near the pivot 3 and is provided at its lower end with a hook 9, adapted to be engaged with and disengaged from the pin or bolt 8, which forms the pivotal connection between the links 6 and 7.

When the feeder-extension 2 is not in use, it is folded downward so as to occupy the position shown in Fig. 2. When the machine is to be used, the extension 2 is moved upward to the position shown in Fig. 2. The hooks 9 of the connections 10 are then engaged with the pins or pivots 8 of the toggle-links, after which the turnbuckle 13 or 15 is operated so as to shorten the extension 2, which has the effect of moving the pivot 8 toward the pivot 3, with the result that the folding extension 2 is forced upward until the shoulders formed by its inner end come in close contact with corresponding shoulders on the projecting end of the stationary member 1 of the feeder. The extension 2 is thus firmly held in its operative position and supported without the use of legs resting on the ground.

It has been found in practice that the use of supporting-legs is disadvantageous, for the reason that they have to be adjusted to inequalities of the ground. There is a tendency for them to settle downward in soft ground, thus permitting the end sections to twist out of alinement, and said legs are also very much in the way when it is necessary to clear away the chaff, straw, and litter which accumulate beneath the feeders. Where the legs are removed to clear away the litter, they have to be readjusted every time the ground is cleared. By the improved arrangement hereinabove described the feeder is self-contained and the feeder-supporting devices are permanently attached to and carried by the feeder-sections.

Having thus described the invention, what is claimed as new is—

The combination with a threshing-machine, and stationary and folding feeder-sections thereon having a shouldered engagement with each other which limits the upward movement of the folding section, of toggle-links connecting said sections, and an extensible connection between the machine and the pivot which connects the toggle-links, said connection having a detachable engagement with the pivot of the toggle-links, substantially as described.

In testimony whereof I affix my signature in presence of two witnesses.

THOMAS H. ROLFE.

Witnesses:
FRED H. WEBB,
CHESTER P. ALDRICH.